Dec. 24, 1940.  E. W. CARROLL  2,225,979
POSITION INSPECTOR AND FINAL ORIENTATOR
Filed Jan. 3, 1940  2 Sheets-Sheet 1
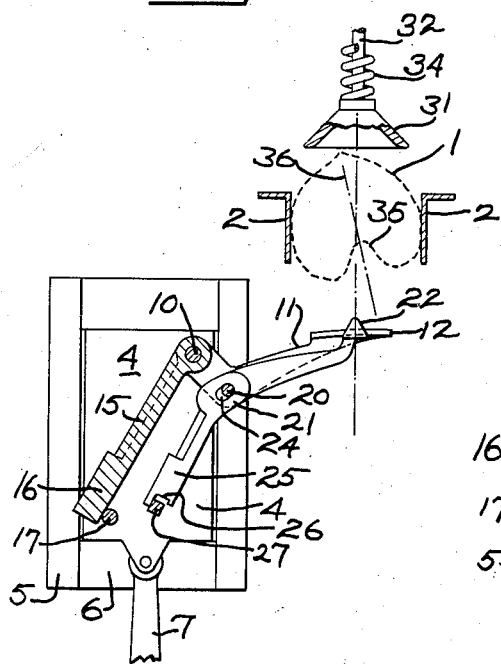
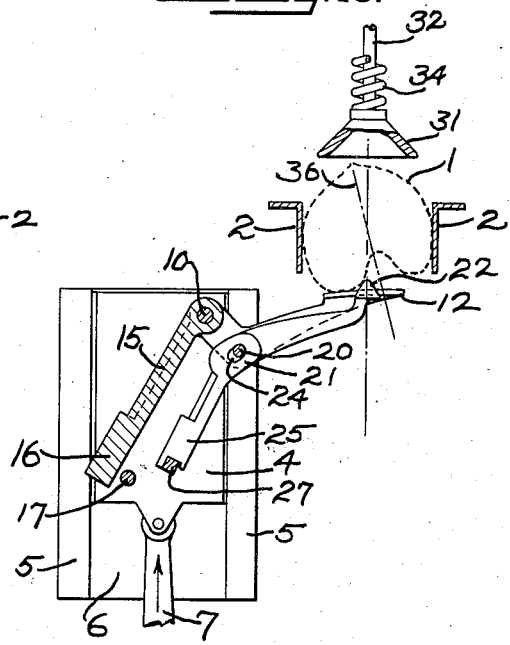
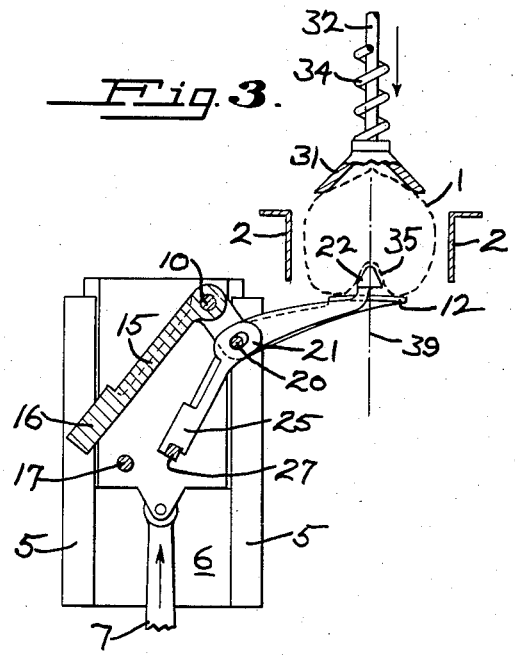
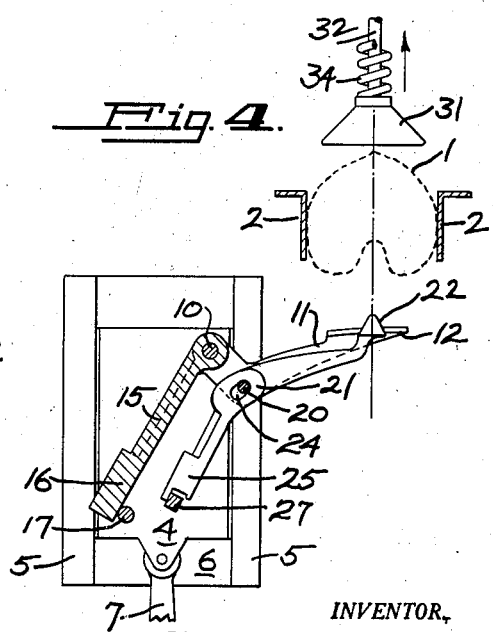
INVENTOR,
ELLSWORTH W. CARROLL.
BY
Lippincott & Metcalf
ATTORNEYS.

Dec. 24, 1940.   E. W. CARROLL   2,225,979
POSITION INSPECTOR AND FINAL ORIENTATOR
Filed Jan. 3, 1940   2 Sheets-Sheet 2
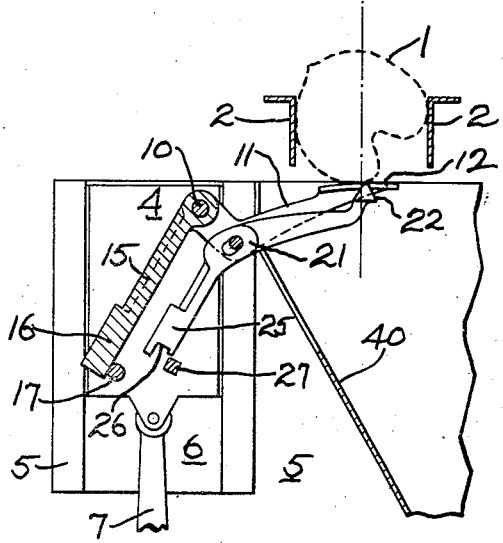
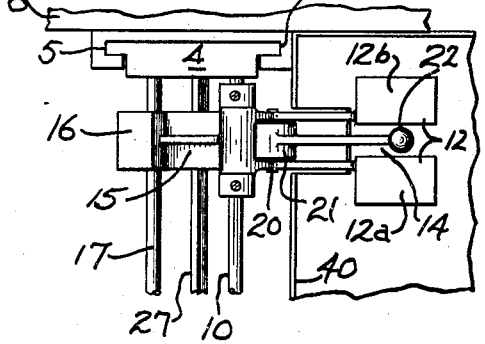
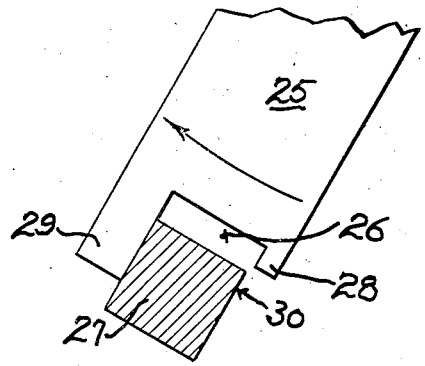
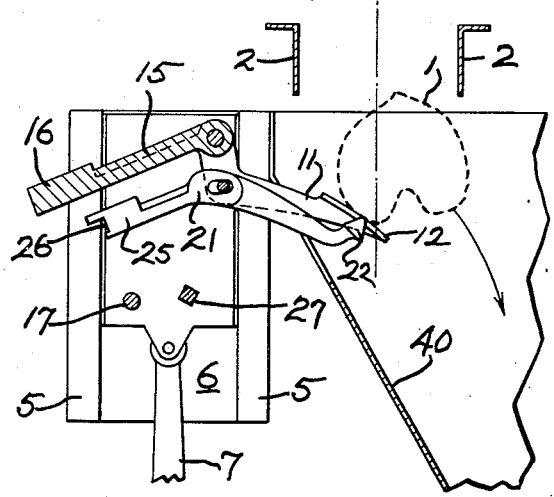
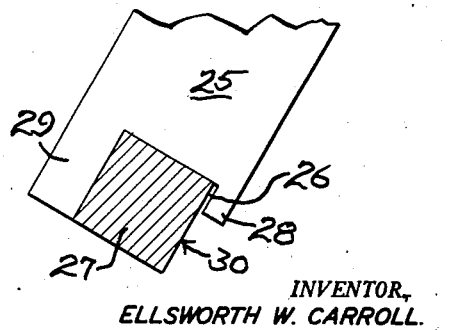
INVENTOR,
ELLSWORTH W. CARROLL.
BY
Lippincott & Metcalf
ATTORNEYS.

Patented Dec. 24, 1940

2,225,979

UNITED STATES PATENT OFFICE 2,225,979

POSITION INSPECTOR AND FINAL ORIENTATOR

Ellsworth W. Carroll, San Francisco, Calif., assignor to S & W Fine Foods, Inc., San Francisco, Calif., a corporation of California Application January 3, 1940, Serial No. 312,188

6 Claims. (Cl. 209—72)

My invention relates to position inspectors used in conjunction with the sorting of orientated fruit, and more particularly to a position inspector which is capable of applying a final centering movement to generally orientated fruit.

Among the objects of my invention are: To provide a means and method of inspecting and sorting fruit that has been subjected to orientating movements; to provide a means and method capable of both sorting orientated fruit and accurately centering the fruit for further operations; to provide a fruit inspection apparatus centering a fruit that is almost completely orientated; and to provide a simple and accurate fruit position inspector and centering device.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

This application is a modification and improvement on the position inspector shown in Figure 12 of my prior copending application Serial No. 211,140 filed June 1, 1938. The present application discloses additional features which apply centering forces to fruit orientated within a small angle of the desired axis.

As in the application mentioned above, the present invention deals with the problem of sorting orientated fruit by the use of the stem indent of the fruit, the fruit being sorted by the action of a trigger. This trigger, if contacted first by the convex surface of the fruit, thus indicating that the fruit is not in the proper orientating position, causes the fruit to be dumped. If, however, the trigger enters the stem indent of the fruit, then the fruit is held and not dumped. The trigger is positioned to enter the stem indent only when the fruit is in relatively proper position. However, fruit such as peaches have relatively large stem indents and consequently the fruit may be generally in an orientated position with the stem indent down, for example, and still not be accurately positioned with the axis of the fruit passing through the stem indent stone and blossom end, exactly vertical.

My present invention operates to hold the fruit for further use when the stem indent is down, even though it is not in the exact position desired. The sorting means is locked by the weight of the fruit when in this generally orientated position, and then additional pressure is applied to the fruit to force the trigger into the stem indent so that an accurate registry may be had, this registry causing a minor, final, and accurate orientation of the fruit with its axis vertical.

Referring to the drawings:

Figure 1 is a diagrammatic and schematic side view of my invention with a partially orientated fruit ready to be sorted.

Figure 2 is a similar view showing the locking of the sorting mechanism by a partially orientated fruit.

Figure 3 is a similar view showing the application of force to the top of the peach, causing the trigger to center itself within the stem indent, thus finally orientating the fruit.

Figure 4 is a similar view showing the next stage in the procedure, with the properly orientated fruit ready for transfer to a following operation such as, for example, a pitting device.

Figure 5 is a schematic and diagrammatic side view showing the sorting mechanism being tripped by contact therewith of an improperly orientated fruit.

Figure 6 is the similar view showing the fruit being dumped.

Figure 7 is a top plan view of the sorting mechanism shown in Figures 1 to 6 inclusive.

Figures 8 and 9 are enlarged diagrammatic views showing the trigger lock.

My invention may be more fully understood by direct reference to the figures. A fruit having a stem indent such as a peach, indicated throughout by broken line 1 is held between a pair of clamp arms 2—2 which are properly controlled by suitable machinery, not shown, to clamp or release the peach as desired.

The filled clamps are transferred by any convenient means, after the fruit therein has been subjected to an orientation mechanism such as that, for example, shown, described and claimed in my prior application cited above, and brought to a position over a sorting mechanism. This mechanism is mounted on a sliding block 4 moving in guideways 5 on a stationary frame 6. Block 4 is reciprocated through crank 7, by a mechanism not shown, the mechanism being coordinately moved with relation to clamps 2 with the contained peach 1, to raise the sorting mechanism into a position directly beneath the fruit, as will be explained later.

Mounted on block 4 by means of a pivot 10 is a sorting lever having oppositely extending arms, a platform arm 11 terminating in a fruit receiving platform 12, this platform being divided into two halves, 12a and 12b leaving an opening 14 therebetween. The other end of the sorting lever is a weight arm 15 terminating in a counterweight 16 heavier than platform 12, thus raising platform 12 to a generally horizontal position, this position being determined by lever stop 17. A trigger pivot 20 is mounted on platform arm 11 of the sorting lever and on pivot 20 is mounted a trigger lever 21 having at one end thereof a conical trigger 22 which extends through opening 14 in platform 12 and slightly above the level thereof in normal position. Trigger pivot 20 preferably fits for translational movement into a slot 24 in the trigger lever rather than in a fitted bearing, although the latter can be used, as will be described later. The lower end of trigger lever 21 is also provided with a trigger counterweight 25 and terminates in a locking notch 26 which fits a lock boss 27, extending from block 4. Locking notch 26 has a small projection 28 on one side thereof, and a longer projection 29 bearing against boss 27 on the other side, to normally maintain trigger 22 in proper position above the level of platform 12. Due to the counterweights, trigger pivot 20 is maintained at the top of slot 24, and in this position small notch projection 28 is above edge 30 of lock boss 27 so that the trigger counterweight is free to swing upwardly if pressure is first placed thereon.

Immediately above the fruit, in the sorting position, I position a contact cone 31 operated by rod 32 through a spring 34 and also provide means to move contact cone 31 into contact with the blossom end of the peach

Having thus described the mechanism of my invention, I will now describe the operation thereof:

Beginning with Figure 1, I will follow through the sequence of operation, first under conditions that exist when a peach is presented, in almost properly orientated position, to the sorting mechanism.

Referring then to Figure 1, peach 1 in this case is presented to the sorting position after having been subjected to the orientation apparatus, with the stem indent 35 in a generally downward position but having the axis of the peach slightly tilted as indicated by broken line 36. The peach is held in this position and connecting rod 7 is operated to move block 4 toward the peach, thus bringing platform 12 into contact with the peach surface, as shown in Figure 2.

It will be noticed that under these conditions, the first contact of the peach with the sorting mechanism is the contact of a convex portion of the peach surface with some portion of platform 12, the trigger 22 not being moved because it can extend into the general stem indent cavity of the fruit surface. Due to this first contact of the peach with the platform 12, the platform is moved downwardly thus moving sorting lever counterweight 16 slightly away from stop pin 17 and dropping notch 26 on the end of the trigger lever around boss 27, as shown in Figure 2, and in Figure 9 in enlarged detail. This first movement of the platform, which has allowed the boss 27 to enter notch 26 in the trigger lever, completely locks the sorting mechanism so that any pressure now applied against the trigger is incapable of unlocking the device. Clamp arms 2 are opened and slide 4 still further elevated. I then apply a downward pressure to the peach by forcing cone 31 against the blossom end of the peach. This drives the platform 12 still further downward due to the fact that trigger pivot 20 can move along slot 24 in the trigger lever until pivot 20 reaches the bottom of the slot. During this downward motion trigger 22 is forced upwardly into the stem indent of the peach. Due to the complimentary conical surfaces of the trigger and the stem indent, the peach is rotated from the tilted position into a more nearly vertical position, as indicated by broken line 39 in Figure 3. In this position the force applied to the peach has been transferred from the platform onto the trigger thus forcing the trigger firmly into the very bottom of the stem indent. The peach is actually held in space, between and by the cone 31 and the trigger. At the same time, the pressure of pivot pin 20 on the bottom of slot 24 of the trigger lever applies a pressure always keeping the trigger lever locked.

After the final orientation has been accomplished, the arms 2 are closed against the peach, holding it in the final orientated position, cone 31 is withdrawn from the blossom end of the peach and slide 4 is pulled downwardly taking all weight off the sorting mechanism and thereby allowing the sorting mechanism to return to resting position as shown in Figure 4. In this position, the contact of the pivot pin 20 with the top of slot 24 withdraws the locking notch 26 away from around boss 27 freeing the trigger, and completely unlocking it.

If, however, the peach is presented to the sorting mechanism in any improperly orientated position as shown, for example, in Figure 5, the first contact of the fruit with the sorting mechanism will be on the trigger. This forces the trigger down to the level of the platform and swings the lower end of the trigger lever outwardly away from boss 27 as shown in Figure 5. When the arms 2 are then opened to release the peach, thus placing the next pressure on the platform, the platform is not locked by action of the trigger lever, swings downwardly, as shown in Figure 6, and the peach is dumped into output chute 40 for rejection or return to the orientating mechanism.

Thus, it can be seen that, in the operation of my device, if first contact of the fruit with the sorting mechanism comes on the platform, due to the fact that the trigger has not been moved because it enters the stem indent, the sorting mechanism will first lock to hold the peach between the transport arms. Further downward pressure on the peach then causes a final orientation due to the further entrance into the stem indent. The trigger has been rendered wholly inoperative as a trigger by the first motion of the platform. If, however, first contact of the fruit comes on the trigger alone, forcing the trigger to the level of the platform, then it is not possible to lock the sorting mechanism and consequently when the peach is released by the arms the fruit will be dumped.

The above recited mechanism differs from the mechanism of my prior application cited above in two ways; first, the first motion of the platform causes a positive lock of the trigger mechanism whereas my prior application depended upon the friction contact alone which could be disturbed by subsequent force applied to the trigger. This alone is a distinction which is very important in handling heavy fruit or fruit with stem indents which vary somewhat in shape.

Another distinct difference in the present mechanism over the mechanism disclosed in the above-cited application, is that once the positive lock has been accomplished by first movement of the platform, the trigger, becoming inoperative as a trigger, can then be used as a more exact centering device, removal of weight from the platform again rendering the trigger fully operative as a trigger for the next fruit.

I do not want to be limited therefore, in the present application to the use of the slot 24 inasmuch as the positive lock of notch 26 in the boss 27 is highly valuable even when used with a bearing which will not allow translational motion of pin 20 therein.

It should also be pointed out that while I have shown the locking mechanism on the end of the trigger lever as comprising a notch 26 in the end of the lever and a boss 27 on the block 4, that it is perfectly obvious that the reciprocal lock is exactly equivalent, i. e. a notch 26 on boss 27 engaging directly the end of counterweight 25.

Furthermore, I would like to point out that the use of counterweights on these levers is optional, springs being deemed the full equivalent thereof. Counterweights however, are preferred because of the fact that in high speed operation of automatic machinery breakage of springs is common and I do not consider springs to be as reliable for such high speed continuous operation as counterweights.

I claim:

1. In combination, a frame, a fruit receiving platform movably mounted on said frame, means applying a force normally holding said platform in a fruit supporting position, a leg movable with said platform and normally occupying predetermined position, means on said frame interlocking with said leg to positively lock said leg to said frame upon downward movement of said platform only when said leg is in said predetermined position, and trigger means projecting above the level of said platform and operating to move said leg out of said predetermined position when depressed by initial fruit contact therewith.

2. In combination, a frame, a fruit receiving platform movably mounted on said frame, means applying a force normally holding said platform in a fruit supporting position, a leg movable with said platform and normally occupying predetermined position, means on said frame interlocking with said leg to positively lock said leg to said frame upon downward movement of said platform only when said leg is in said predetermined position, and trigger means projecting above the level of said platform for controlling the position of said leg and thereby the support of said fruit upon initial fruit contact with said trigger means.

3. In combination, a frame, a fruit receiving platform movably mounted on said frame, means applying a force normally holding said platform in a fruit supporting position, a leg movable with said platform and normally occupying predetermined position, means on said frame interlocking with said leg to positively lock said leg to said frame upon downward movement of said platform only when said leg is in said predetermined position, and trigger means projecting above the level of said platform and operating to move said leg out of said predetermined position when moved by fruit contact before said platform has moved to lock said leg to said frame.

4. A fruit position inspector comprising in combination a frame, a lever pivoted on said frame, a fruit receiving platform on one end of one arm of said lever, a counterweight on the other arm of said lever, a stop bearing against said lever, to determine the upper position of said platform, a trigger mounted for rotational and translational movement on the platform arm of said lever, said trigger having one end thereof projecting through said platform above the level thereof, a notch on the other end of said trigger and a lock pin on said frame normally outside of said notch, being moved to engage said pin upon relative translational movement of said trigger and said lever due to weight of fruit carried on said platform alone, said notch being rotated away from pin engaging position by weight of fruit first contacting the portion of said trigger projecting above said platform.

5. In combination a frame, a fruit receiving platform mounted on said frame, a trigger projecting above the plane of said platform, and means operating only in response to weight of a fruit on said platform to positively interlock said platform to said frame, said means being movable to a position where interlock is impossible by first movement of said trigger.

6. In combination means for supporting a fruit thereon with the stem indent down, a trigger entering said stem indent when said stem indent is down, and normally controlling said supporting means, means operating in response to first movement of said supporting means for rendering said trigger inoperative to control said supporting means, and means for applying additional movement to said supporting means to cause said trigger to further enter said stem indent to center said fruit.

ELLSWORTH W. CARROLL.